(12) United States Patent
Andrews et al.

(10) Patent No.: US 9,092,233 B2
(45) Date of Patent: Jul. 28, 2015

(54) ACCESSORY BOOTING OVER USB

(75) Inventors: Jonathan J. Andrews, San Jose, CA (US); Alexei Kosut, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 13/607,454

(22) Filed: Sep. 7, 2012

(65) Prior Publication Data
US 2014/0075169 A1    Mar. 13, 2014

(51) Int. Cl.
G06F 9/44    (2006.01)
G06F 9/445    (2006.01)

(52) U.S. Cl.
CPC ............... *G06F 9/4416* (2013.01); *G06F 8/60* (2013.01); *G06F 9/4411* (2013.01)

(58) Field of Classification Search
CPC .................................................. G06F 9/4401
USPC .............................................................. 713/2
See application file for complete search history.

(56) References Cited

U.S. PATENT DOCUMENTS

| | | | |
|---|---|---|---|
| 6,971,002 B2 | 11/2005 | Austen | |
| 6,973,658 B2 * | 12/2005 | Nguyen | 719/327 |
| 7,363,480 B1 | 4/2008 | Righi | |
| 7,825,323 B2 * | 11/2010 | Yanase et al. | 84/645 |
| 8,185,673 B2 * | 5/2012 | Nakajima | 710/36 |
| 8,433,887 B2 * | 4/2013 | Hitaka et al. | 713/2 |
| 8,589,667 B2 * | 11/2013 | Mujtaba et al. | 713/2 |
| 2003/0220988 A1 * | 11/2003 | Hymel | 709/220 |
| 2005/0278774 A1 * | 12/2005 | Eshleman et al. | 725/153 |
| 2006/0242395 A1 | 10/2006 | Fausak | |
| 2011/0107317 A1 | 5/2011 | Nolterieke et al. | |
| 2012/0079287 A1 | 3/2012 | Leclercq | |

FOREIGN PATENT DOCUMENTS

| | | |
|---|---|---|
| EP | 2378454 A2 | 10/2011 |
| JP | 2005222287 A * | 8/2005 |
| WO | WO02/095581 A2 | 11/2002 |

OTHER PUBLICATIONS

Notification of Transmittal of the International Search Report and the Written Opinion of The International Searching Authority, or the Declaration; International Search Report and Written Opinion of The International Searching Authority for corresponding International Application No. PCT/US2013/037632 mailed on Jul. 18, 2013, 12 pages.
International Preliminary Report on Patentability for International PCT Application No. PCT/US2013/037632, mailed Mar. 19, 2015, 10 pages.

* cited by examiner

*Primary Examiner* — Suresh Suryawanshi
(74) *Attorney, Agent, or Firm* — Kilpatrick Townsend & Stockton LLP (57) ABSTRACT

Methods, systems, and apparatuses for booting an accessory with an accessory firmware image received from a host device are described. When the host device detects a connection between the accessory and the host device, the host device may send a request for an accessory identifier to the accessory. The accessory may send an accessory identifier to the host device in response. The host device may select an accessory firmware image that is suitable for the accessory, and may transmit the accessory firmware image to the accessory. The accessory firmware image may include information that the accessory can use to enable the accessory to exchange application data with the host device.

30 Claims, 7 Drawing Sheets

ACCESSORY BOOTING OVER USB

BACKGROUND

The present disclosure generally relates to accessories that interoperate with computing devices, and in particular to the booting of such accessories.

In recent years, the number of computing devices that a user can use to perform functions such as media storage and playback, networking, web browsing, email, word processing, data storage, application execution, and/or any other computing or communication functions have grown dramatically. Computing devices that can perform these functions range from desktop computers, gaming consoles, media servers/players, to portable computing devices such as laptops, netbooks, tablets, mobile phones, personal digital assistants (PDAs), portable media players/readers, portable gaming devices, and the like. Examples of computing devices include various iPhone® and iPod® models manufactured and sold by Apple Inc., assignee of the present application, as well as other electronic devices made and sold by other manufacturers and distributors under their respective brand names.

Along with the growth of computing devices, accessories have also been created for use with the computing devices. Such accessories can communicate with a computing device using one or more connectors, ports, and/or communication interfaces. Such accessories can be used to control features of the computing device or be used by the computing device to interact with users and/or the environment. When an accessory is turned on or initially receives power, the accessory may execute a boot sequence to load accessory software that the accessory uses to interoperate with a computing device.

However, the accessory software of the accessory may not always be compatible with the software that is running on the computing device. As a result, there may be instances when an accessory is prohibited from interoperating with the computing device due to software incompatibility between the accessory and the computing device. For example, suppose a user has an accessory such as a speaker dock that can be docked with different computing devices such as a portable media player (e.g., an iPod®) or a mobile phone (e.g., an iPhone®). The user may have a mobile phone that is running one version of a mobile device software which is compatible with the software of the speaker dock. The same user may have a portable media player that is running a different version of the mobile device software, which may be incompatible with the software of the speaker dock. In such a scenario, the user may be prohibited from using the portable media player with the speaker dock because of the software incompatibility between the two devices.

One way to eliminate such software incompatibility is to ensure that the accessory (speaker dock in our example above) and the mobile phone and the portable media player are all updated with a version of software that is compatible with each other. However, this is cumbersome and requires the user to constantly ensure that all his devices have compatible software versions. In instance where the user had many devices, such a scheme would be highly impractical and greatly diminishes the user experience with these devices.

BRIEF SUMMARY

Various embodiments of this disclosure describe methods for booting an accessory with an accessory firmware image that is transmitted to the accessory from a host device (e.g., a computing device). In some embodiments, when a connection between an accessory and a host device is detected, the host device may authenticate the accessory by sending a request for an accessory identifier to the accessory. Upon authenticating the accessory, the host device may select an accessory firmware image that is suitable for the accessory, and transmit the accessory firmware image to the accessory. The accessory firmware image may include information that the accessory can use to enable the accessory to exchange application data and interoperate with the host device. For example, the accessory firmware image may include program code that the accessory can execute to load accessory software such as an operating system (OS) and/or application program(s) that the accessory can run to communicate and exchange application data with the host device using an application or device specific protocol.

According to various embodiments of the present invention, an accessory does not store any accessory firmware image in the accessory prior to receiving the accessory firmware image from the host device. In other words, prior to receiving the accessory firmware image from the host device, neither the non-volatile memory nor the any other memory (e.g., random access memory) of the accessory has a pre-loaded accessory firmware image that the accessory can use to boot itself. Instead, the accessory may boot using an accessory firmware image that a host device sends to the accessory upon authenticating the accessory.

Various embodiments of the present invention also provide a host device that may have multiple firmware images stored therein. A host device may have a host firmware image that the host device uses to boot itself, and one or more accessory firmware images used for booting different types of accessories that the host device can interoperate with. Upon detecting a connection with an accessory, the host device may select a suitable accessory firmware image for that particular accessory, and transmit the accessory firmware image to the accessory such that the accessory can boot using the accessory firmware image selected by the host device.

The following detailed description, together with the accompanying drawings, will provide a better understanding of the nature and advantage of the embodiments disclosed herein.

DETAILED DESCRIPTION

Various embodiments of the present invention are directed to booting an accessory using information received from a host device. According to some embodiments of the present invention, an accessory does not store/have a preloaded accessory firmware image, and relies on a host device to transmit a suitable accessory firmware image to the accessory. In some embodiments, when a host device detects a connection with an accessory, the host device may authenticate the accessory and transmit an accessory firmware image to the accessory. The accessory can then use the accessory firmware image, received from the host device, during the boot sequence of the accessory to load accessory software that can be used to exchange data and interoperate with the host device.

According to some embodiments of the present invention, the host device may store a host firmware image that is used for booting or initializing the host device. In addition, the host device may also include one or more accessory firmware images associated with different types of accessories. The accessory firmware images can be maintained to be in a version that is compatible with the host firmware image. Because the accessory firmware images in the host device are kept in a version that is compatible with the host firmware image, compatibility can be ensured between the host software running on the host device and the accessory software that gets loaded into the accessory using an accessory firmware image from the host device. A user can use the same accessory with different host devices without requiring the user to manually update the software of the accessory prior to using the accessory with a new or different host device. Furthermore, in some embodiments, because the accessory does not have preloaded accessory firmware image, the memory capacity of the non-volatile memory in the accessory can be reduced to lower the cost of manufacturing.

Figure 1A:
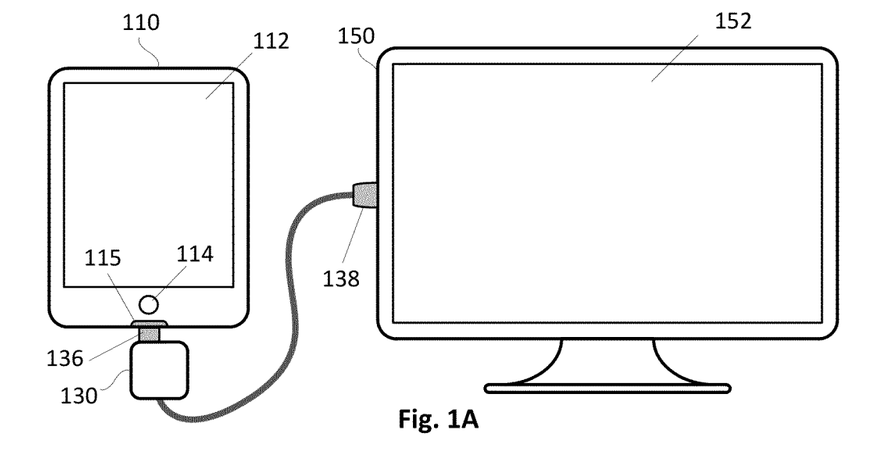
FIG. 1A illustrates an accessory coupled to a host device that the accessory can use for booting the accessory according to one embodiment of the present invention.

FIG. 1A illustrates an accessory 130 coupled to a host device 110 that accessory 130 can use for booting, according to one embodiment. In this embodiment, host device 110 may be a tablet computing device as shown or be another type of computing device. Host device 110 may include a user interface 112 such as a touch screen, and one or more buttons 114 that a user can use to operate and control host device 110. Host device 110 can also include an accessory interface 115 (e.g., a connector, port, and/or communication interface) to couple host device 110 to accessory 130. According to this embodiment, accessory 130 may be a dongle as shown that can be used to connect host device 110 to a peripheral device 150. Accessory 130 may include a host interface 136 (e.g., a connector, port, and/or communication interface) to couple accessory 130 to host device 110, and a peripheral interface 138 (e.g., a connector, port, and/or communication interface) to couple accessory 130 to peripheral device 150. The peripheral interface 138 of accessory 130 may include a wireless communication interface to provide a wireless connection (e.g., wireless USB, WiFi, Bluetooth, etc.) to peripheral device 150. In other embodiments, either or both the peripheral interface 138 and/or host interface 136 can provide a wired or wireless connection to the respective devices. Accessory 130 may include accessory specific hardware to perform the specific functions of accessory 130 such as circuitry for converting data from host device 110 into a suitable format for peripheral device 150. In this embodiment, peripheral device 150 can be a display monitor as shown. In other embodiments, peripheral device 150 can be any type of accessory. Peripheral device 150 may include a screen 152 that can be used to display media files and/or other information that are transmitted from host device 110 to peripheral device 150 through accessory 130.

Figure 1B:
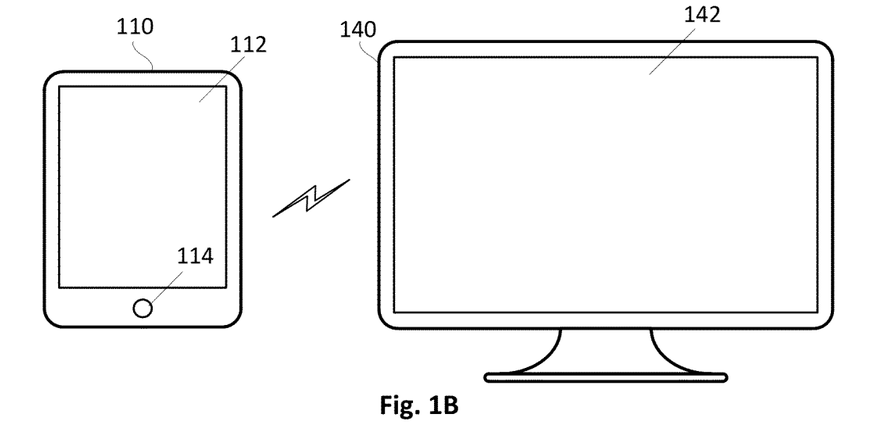
FIG. 1B illustrates an accessory coupled to a host device that the accessory can use for booting the accessory according to another embodiment of the present invention.

FIG. 1B illustrates an accessory 140 coupled to a host device 110 that accessory 140 can use for booting, according to one embodiment. Host device 110 may be a tablet computing device as shown or be another type of computing device. The accessory interface (not shown) of host device 110 may include a wireless communication interface (e.g., wireless USB, WiFi, Bluetooth, etc.) that can communicate and exchange data with accessory 140. According to this embodiment, accessory 140 may be a display monitor as shown or be any type of accessory that can be used with host device 110. The host interface (not shown) of accessory 140 may include a wireless communication interface to provide a wireless connection (e.g., wireless USB, WiFi, Bluetooth, etc.) to communicate and exchange data with host device 110. In other embodiments, a cable can be used to connect the host interface of accessory 140 to host device 110.

Host device 110 shown in FIGS. 1A-B can be any type of computing and/or communication device without limitation. For example, a desktop computer, a gaming console, a media server/player, a laptop, a netbook, a tablet computer, a mobile phone, a PDA, a portable media player/reader, a portable gaming device, and the like can be used. Host device 110 can provide one or more of media player capability, networking, web browsing, email, word processing, data storage, application execution, and/or any other computing or communication functions.

Accessory 130 or 140 shown in FIGS. 1A-B can be any device capable of communicating with host device 102 such as, for example, a dongle, a docking station, a hub, an external speaker system, an external video device (e.g., a display monitor or a projector), a multimedia device, a consumer electronic device, a test instrument, a home appliance (e.g., refrigerator or dishwasher), exercise equipment, a security system, a home or office automation system, a camera, a user input device (e.g., keyboard, mouse, game controller), a measurement device, a medical device (e.g., glucose monitor or insulin monitor), a point of sale device, an automobile, an automobile accessory (e.g., a car stereo system or car navigation system), a radio (e.g., FM, AM and/or satellite), an entertainment console on an airplane, bus, train, or other mass transportation vehicle, etc. Any type of device that can be used in conjunction with a host device can be used as an accessory.

Figure 2:
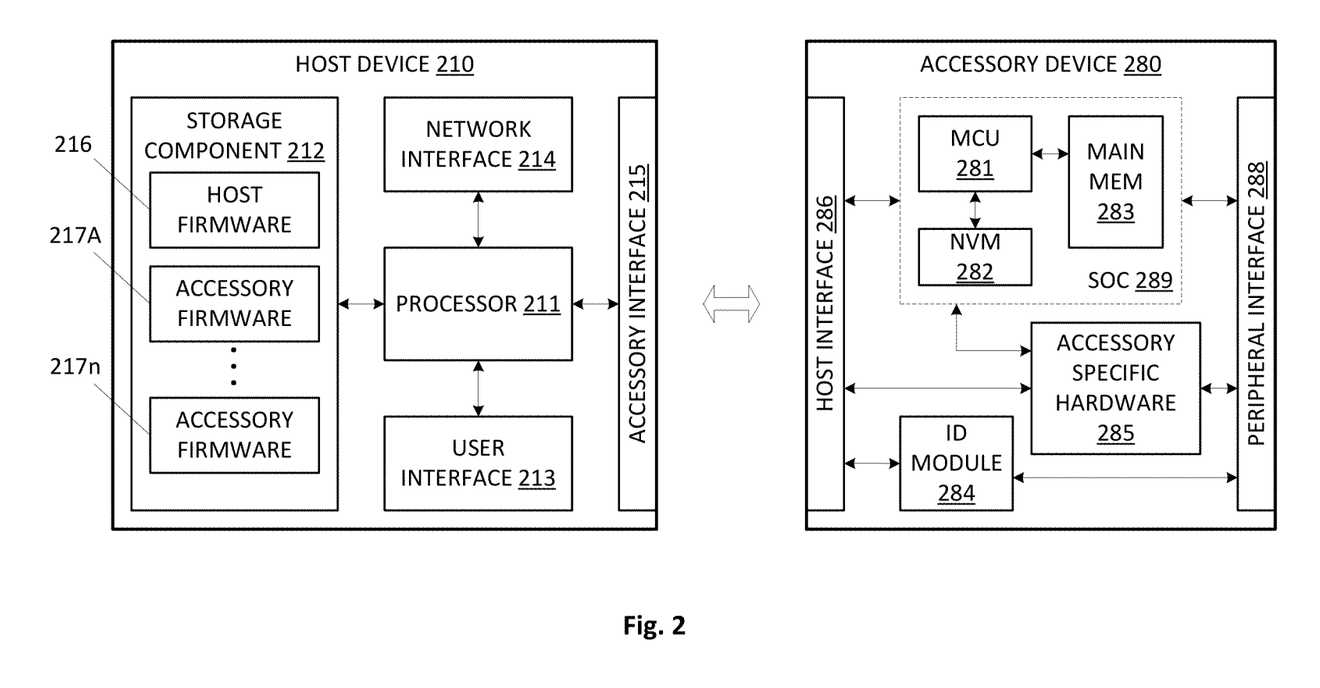
FIG. 2 illustrates a block diagram of an accessory coupled to a host device according to one embodiment of the present invention.

FIG. 2 illustrates a block diagram of a host device 210 (e.g., implementing host device 110 of FIGS. 1A-B) communicatively coupled to an accessory 280 (e.g., implementing accessory 130 or 140 of FIGS. 1A-B) according to some embodiments. Host device 210 may be communicatively coupled to accessory 280 via a wired communication channel such as Universal Serial Bus ("USB"), FireWire (IEEE 1394 standard), or universal asynchronous receiver/transmitter ("UART"), or the like, or a wireless communication channel such as wireless USB, Bluetooth (a short range wireless communication standard developed by the Bluetooth SIG and licensed under the trademark Bluetooth®), WiFi (adhering to any of the IEEE 802.11 family standards), or the like.

Host device 210 can include processor 211, storage component 212, user interface (UI) 213, network interface 214, and accessory interface 215. Processor 211, which can be implemented as one or more integrated circuits (including, e.g., one or more microprocessors and/or microcontrollers and/or a multi-core processor), may control the operation of host device 210. For example, in response to user input signals provided by user interface 213, processor 211 can perform various tasks such as selecting and playing media assets that may be stored in storage component 212, accessing various networks (e.g., a mobile telephone network, the Internet, local area network, or the like) to send and/or retrieve data using network interface 214, executing software such as an operating system (OS) and/or application programs residing in storage component 212, and so on. Processor 211 can also manage communication and exchange data with accessories via accessory interface 215.

User interface 213 can include input controls such as a touch pad, touch screen, scroll wheel, click wheel, dial, button, keypad, microphone, etc., as well as output devices such as a display screen, indicator lights, speakers, headphone jacks, etc., together with supporting electronics (e.g., digital-to-analog or analog-to-digital converters, signal processors or the like). A user can operate the various input controls of user interface 213 to invoke the functionalities of host device 210 and can also view and/or hear output from host device 210 via user interface 213.

Storage component 212 may be implemented, for example, using disk, non-volatile memory such as flash memory, ROM, PROM, EPROM or other non-volatile storage medium, or a combination thereof. Storage component 212 may also include random access memory (RAM). In some embodiments, storage component 212 may store a host firmware image 216 using, for example, non-volatile memory. When host device 210 is powered on, processor 211 may execute program code in host firmware image 216 to load software such as an operating system (OS) into, for example, the RAM (not shown) of storage component 212. Processor 211 may then run the OS from the RAM of storage component 212 to manage the operation of host device 210.

In some embodiments, storage component 212 may store one or more accessory firmware images $217_{(1)-(n)}$ that can be used for booting different types of accessories that host device 210 can interoperate with. In some embodiments, 'n' can be any number depending on the number of accessories and the memory capacity of storage component 212. Accessory firmware images $217_{(1)-(n)}$ may be used by accessories to load accessory software that is compatible with the host software that host firmware image 216 loads into host device 210. For example, accessory firmware images $217_{(1)-(n)}$ may be used by accessories to load the same type and/or version of OS and/or application program(s) that the host firmware image 216 loads into the host device 210. Accessory firmware images $217_{(1)-(n)}$ can be based in part on host firmware image 216, and can be derived or be built from host firmware image 216. For example, accessory firmware images $217_{(1)-(n)}$ may include some portions or sections of host firmware image 216. Thus, accessory firmware images $217_{(1)-(n)}$ may include some of the same program code as host firmware image 216. Additionally or alternatively, accessory firmware images $217_{(1)-(n)}$ may include program code that invokes the same set of functional calls or uses the same set of library functions as host firmware image 216. In other embodiments, accessory firmware images $217_{(1)-(n)}$ may include more or less information compared to host firmware image 216. Some of the additional information in the accessory firmware image may be specific to the type of accessory that uses the accessory firmware image. Moreover, in some embodiments, the accessory firmware images may also differ from one another based on the type of accessory that uses the accessory firmware image. For example, an accessory firmware image for a video accessory may be different from an accessory firmware image for an audio accessory. In some embodiments, an accessory may support multiple versions and/or types of accessory firmware images.

Each accessory firmware image may be associated with at least one type of accessory that can be used with host device 210. For example, one accessory firmware image may be associated with an external video device, and this particular accessory firmware image can be used by the external video device (e.g., a display monitor or a projector) to load accessory software that the external video device can run to perform video-related functions such as video encoding/decoding to display a video from host device 210. As another example, another accessory firmware image may be associated with an external speaker system, and this particular accessory firmware image can be used by the external speaker system to load accessory software that the external speaker system can run to perform audio processing functions and to play audio files from host device 210. In some embodiments, an accessory firmware image can be used by more than one type of accessory. In other words, in some embodiments, multiple types of accessories may use the same accessory firmware image. Such an accessory firmware image may include some program code that is commonly executed by several different types of accessories, as well as program code that may be specific to a certain type of accessory. A particular accessory using such an accessory firmware image to boot may selectively load and/or execute only the portions of the accessory firmware image that are relevant to the particular accessory.

In some embodiments, accessory firmware images $217_{(1)-(n)}$ may be stored in non-volatile memory of storage component 212 or in other types of memory in storage component 212 such as RAM or disk. Accessory firmware images $217_{(1)-(n)}$ may be preloaded into storage component 212 by a manufacturer. Accessory firmware images $217_{(1)-(n)}$ may also be loaded into storage component 212 from an external device using, for example, network interface 214 or a connection through a connector/port of host device 210. In other embodiments, host device 210 may compile and build accessory firmware images $217_{(1)-(n)}$ from host firmware image 216. For example, in one embodiment, only host firmware image 216 may be preloaded into non-volatile memory of storage component 212. When host device 210 powers up, processor 211 may read host firmware image 216 from storage component 212, and build accessory firmware images $217_{(1)-(n)}$ using at least some portions of host firmware image 216. The accessory firmware images $217_{(1)-(n)}$ built by processor 211 may be stored in RAM or other type of memory in storage component 212 for subsequent transmission to accessories.

According to some embodiments, accessory firmware images $217_{(1)-(n)}$ stored in host device 210 can be maintained to be in a version that is compatible with host firmware image 216. For example, whenever host firmware image 216 in host device 210 is modified (e.g., updating to a new version or reverting back to an older version), host device 210 may rebuild accessory firmware images $217_{(1)-(n)}$ using the modified version of host firmware image 216. In other embodiments, compatible version of accessory firmware images $217_{(1)-(n)}$ can be loaded into host device 210 together with the modified/updated host firmware image 216.

In some embodiments, storage component 212 may also store one or more accessory boot loaders that can be used by an accessory to load an accessory firmware image from host device 210. For example, an accessory boot loader may include program code that an accessory can execute to initialize the main memory of the accessory and/or other components of the accessory. An accessory boot loader may direct the accessory to load an accessory firmware image from host device 210 at a particular memory location in the main memory of the accessory. An accessory boot loader may also provide instructions to an accessory to execute or load only certain portions of an accessory firmware image that are relevant to the particular accessory.

Storage component 212 may also store application programs that are executable by processor 211 and various data that can be used in managing communication with various accessories. Application programs can include any program executable by processor 211. In some embodiments, certain application programs can be installed on host device 210 by its manufacturer, while other application programs can be installed by a user. Examples of application programs can include video game programs, personal information management programs, programs for playing media assets and/or navigating the media asset database, programs for controlling a telephone interface to place and/or receive calls, and so on. Certain application programs may provide communication with and/or control of an accessory, and certain application programs may be responsive to control signals or other input from an accessory.

In some embodiments, storage component 212 can also store media assets such as audio, video, still images, or the like, that can be played by host device 210 or an accessory communicatively coupled to host device 210 such as accessory 280, along with metadata describing the media assets (e.g., asset name, artist, title, genre, etc.), playlists (lists of assets that can be played sequentially or in random order), and the like. Storage component 212 can also store any other type of information such as information about a user's contacts (names, addresses, phone numbers, etc.); scheduled appointments and events; notes; and/or other personal information.

Network interface 214 can provide an interface to one or more communication networks. For example, network interface 214 can incorporate a radio-frequency (RF) transceiver and suitable components for communicating via a mobile communication network such as a mobile telephone network. Additionally or instead, network interface 214 can incorporate a wireless connection to the Internet (e.g., a WiFi transceiver, 3G/4G (e.g., LTE) transceiver or the like), to a personal area network (e.g., a Bluetooth network), or any other network. In still other embodiments, a wired network connection (e.g., Ethernet) may be provided. In some embodiments, the same hardware can be used to support connections to multiple networks; thus, network interface 214 can include analog-to-digital and/or digital-to-analog circuitry, baseband processing components (e.g., codecs, channel estimators, and the like), modulators, demodulators, oscillators, amplifiers, transmitters, receivers, transceivers, internal and/or external antennas, and so on. In some embodiments, some operations associated with network connectivity can be implemented entirely or in part as programs executed on processor 211 (e.g., encoding, decoding, and/or other processing in the digital domain), or a dedicated digital signal processor can be provided.

Accessory interface 215 can include a number of signal paths configured to carry various signals between host device 210 and an accessory such as accessory 280. In one embodiment, accessory interface 215 may include a 30-pin connector corresponding to the connector used on iPod® or iPhone® products manufactured and sold by Apple Inc., or other types of connector and/or port such as a USB connector, FireWire connector, or the like. In other embodiments, a connector with 4 to 30 pins or a configurable and/or reversible connector can be used. Alternatively or additionally, accessory interface 215 can include a communication interface such as a wireless interface (e.g., wireless USB, WiFi, Bluetooth or the like). Accessory interface 215 may also be used by host device 210 to communicate with other devices such as a host computer or accessory device 280

Accessory 280 can include a controller (MCU) 281, non-volatile memory (NVM) 282, main memory 283, accessory specific hardware 285, and a host interface 286. In some embodiments, accessory 280 may also include an ID module 284 and/or a peripheral interface 288. According to some embodiments, controller 281, non-volatile memory 282, and main memory 283 may be integrated in a system-on-chip (SoC) 289. In other embodiments, one or more of these components can be provided separately.

Controller 281 can include, e.g., one or more microprocessors or one or more microcontrollers executing program code to perform various functions such as digital audio decoding, analog or digital audio and/or video processing, processing of user input, controlling of accessory functionality and the like. Controller 281 can also manage communication with a host device such as host device 210 via host interface 286. In some embodiments, controller 281 can also manage communication with a peripheral device via peripheral interface 288.

Non-volatile memory (NVM) 282 may include one or more of various types of flash memory, ROM, PROM, and/or EPROM. In some embodiments, NVM 282 does not have any accessory firmware image stored therein. Instead, NVM 282 may store host interface initialization code that accessory 280 can use at power-up to initialize host interface 286. For example, the host interface initialization code may include program code with a set of instructions to enable host interface 286 to communicate with a host device such as host device 210. It should be noted that according to some embodiments, the host interface initialization code does not include any program code for establishing an OS and/or loading any application programs onto accessory 280. In other words, execution of the host interface initialization code alone does not load any accessory software onto accessory 280. Instead, the host interface initialization code is used to enable host interface 286 to communicate with a host device (e.g., host device 210) such that accessory 280 can obtain from a host device further information or instructions (e.g., an accessory boot loader, an accessory firmware image, or both) that accessory 280 can use to load accessory software.

According to some embodiments, because NVM 282 does not store any accessory firmware image, the memory capacity of NVM 282 can be smaller than the size of the accessory firmware image used by accessory 280. NVM 282 may include one or more non-volatile memory devices, and the size of the accessory firmware image used by accessory 280 may be larger than the memory capacity of each of the non-volatile memory devices. In some embodiments, the size of the accessory firmware image used by accessory 280 may be larger than a combined memory capacity of all of the non-volatile memory devices in accessory 280.

In some embodiments, NVM 282 may store an accessory boot loader that includes information to enable controller 281 to properly load an accessory firmware image from host device 210. For example, an accessory boot loader may include program code that can be executed by controller 281 to initialize main memory 283 and/or other components of accessory 280. An accessory boot loader may include program code to direct controller 281 to load an accessory firmware image received from host device 210 at a particular memory location in main memory 283 of accessory 280. An accessory boot loader may also provide instructions to controller 281 to execute or load only certain portions of an accessory firmware image that are relevant to accessory 280. It should be noted that according to some embodiments, the accessory boot loader does not include any program code for establishing an OS and/or loading any application programs onto accessory 280. In other words, execution of the accessory boot loader alone does not load any accessory software onto accessory 280. Instead, the accessory boot loader is used to enable accessory 280 to obtain and store an accessory firmware image or portions of an accessory firmware image into the main memory of accessory 280.

In other embodiments, NVM 282 may not have any accessory boot loader stored therein. In such embodiments, an accessory boot loader may be provided to accessory 280 from a host device. In some embodiments, accessory 280 may use an accessory identifier that is sent to a host device during authentication of accessory 280 to indicate to the host device whether accessory 280 requires the host device to provide an accessory boot loader to accessory 280.

Main memory 283 can be implemented using any type of volatile memory such as various types of random access memory (RAM) and/or other storage medium that does not retain data when power is removed from accessory 280. Main memory 283 can store software and/or data used by controller 281 or other components of accessory 280. For example, main memory 283 can store accessory software that can provide instructions for controller 281 to interact with host device 210, accessory specific hardware 285, and/or a user interface (not shown) of accessory 280. Accessory 280 can also receive information (e.g., user input, metadata, and/or application data) from host device 210 which can also be stored in main memory 283. According to some embodiments, an accessory firmware image received from host device 210 may be stored in main memory 283. In embodiments that may not have a preloaded accessory boot loader stored in NVM 282 of accessory 280, an accessory boot loader received from host device 210 may be stored in main memory 283, and controller 281 may execute the accessory boot loader from main memory 283 to load an accessory firmware image received from host device 210 into main memory 283. Controller 281 may execute the accessory firmware image from main memory 283 to load accessory software such as an operating system (OS) and/or application program(s) into main memory 283. Controller 281 may run the OS and/or application program(s) from main memory 283 to manage and perform the functionality of accessory 280.

It should be noted that according to some embodiments, accessory 280 does not store any accessory firmware image in the NVM 282 of accessory 280, even after accessory 280 receives an accessory firmware image from host device 210. In other words, accessory 280 does not load the accessory firmware image received from host device 210 into NVM 282. Thus, this is different than firmware update procedures that may download firmware into the NVM of an accessory. Furthermore, when power is removed from accessory 280, accessory 280 does not retain the accessory firmware image, because the accessory firmware image from host device 210 is stored in the main memory (e.g., RAM) of accessory 280. Thus, every time power is removed and then restored to accessory 280, accessory 280 may require the host device that accessory 280 is being used with to send an accessory firmware image to accessory 280. This allows the software (e.g., OS and/or application program(s)) running on accessory 280 to be compatible with the software running on a host device regardless of which particular or type of host device that accessory 280 is being used with.

It should be understood that the process of obtaining an accessory firmware image from a host device according to embodiments of the present invention is different than obtaining a device driver from a host device. Prior to obtaining and executing the accessory firmware image from a host device, the accessory may not be running any accessory software in the accessory. In order for an accessory to obtain a device driver (which can be operating system dependent), an operating system has to be first established in the accessory. Once an operating system is established and running in the accessory, the accessory can then communicate with a host device to obtain a device driver. In contrast, the process of obtaining an accessory firmware image from a host device according to embodiments of the invention is performed without an operating system running in the accessory.

Accessory specific hardware 285 can represent any hardware needed to enable desired functionality of accessory 280. For example, accessory specific hardware 285 can include signal processing components that process signals received on host interface 286, peripheral interface 288, and/or other components of accessory specific hardware 285 before sending the signals to controller 281, and/or to convert signals from controller 281 for transmission to a host device (e.g., host device 210) or a peripheral device.

In some embodiments, accessory specific hardware 285 can include network and/or communication interfaces. For example, accessory specific hardware 285 can include an RF receiver (e.g., for FM, AM, satellite radio, and/or other bands) and/or an RF transmitter (e.g., a short range transmitter for personal use). In other embodiments, accessory specific hardware 285 can include a communication interface to a personal area network, such as a Bluetooth transceiver or other short range wireless communication interface. In still other embodiments, accessory specific hardware 285 can include a telephone interface, GSM, CDMA, and/or other voice and/or data network interfaces.

According to some embodiments, accessory specific hardware 285 may include one or more data gathering devices such as sensors and/or meters. Accessory specific hardware 285 may include computer controllable devices. Examples of computer controllable devices include sensors, meters, motors, actuators, lights, cameras, valves, speakers, display screens, printers, and/or any other equipment that is controllable by controller 281. In some embodiments, an application program executing on host device 210 can send control signals to accessory 280, and controller 281 can operate accessory specific hardware 285 in response to the control signals. In some embodiments, accessory specific hardware 285 can include components of a user interface. Thus, an application program executing on host device 210 can receive user input from accessory 280, provide output to a user via accessory 280, and/or control, interact with, or respond to any operation that accessory 280 is capable of performing.

Accordingly, accessory specific hardware 285 can encompass any hardware component for which interoperability with a host device such as a computing and/or communication device may be desirable.

In some embodiments, accessory 280 may include a user interface (not shown) that can include input controls, such as a touch pad, touch screen, scroll wheel, click wheel, dial, button, keypad, microphone, probes, etc., as well as output devices, such as a video screen, indicator lights, speakers, headphone jacks or the like, together with supporting electronics (e.g., digital-to-analog or analog-to-digital converters, signal processors or the like). A user can operate the various input controls of the user interface to invoke the functionality of accessory 280 and can view and/or hear output from accessory 280 via the user interface. In addition, in some embodiments, a user can operate host device 210 (or application programs executing thereon) via the user interface of accessory 280.

Host interface 286 can include a number of signal paths configured to carry various signals between accessory 280 and host device 210. In one embodiment, host interface 286 can include a connector adapted to mate with a 30-pin connector used on iPod® and iPhone® products manufactured and sold by Apple Inc. Other connectors can also be used, for example, a USB connector, FireWire connector, or the like. In other embodiments, a connector with 4 to 30 pins or a configurable connector can be used. Alternatively or additionally, host interface 286 can include a communication interface such as a wireless interface (e.g., wireless USB, WiFi, Bluetooth, or the like).

In some embodiments, accessory 280 may include a peripheral interface 288 to provide connectivity to a peripheral device, for example, another accessory device such as an external video device (e.g., a display monitor, a projector), a printer, etc. Peripheral interface 288 can include a number of signal paths configured to carry various signals between accessory 280 and a peripheral device. In some embodiments, peripheral interface 288 can include a connector such as a USB connector, FireWire connector, or the like. In other embodiments, peripheral interface 288 can include other types of multimedia connector such as a HDMI, VGA, DisplayPort, composite connectors, or the like. Alternatively or additionally, peripheral interface 288 can include a communication interface such as an Ethernet port and/or a wireless interface (e.g., wireless USB, WiFi, Bluetooth or the like).

In various embodiments, accessory 280 may also include an identification (ID) module 284 that accessory 280 may use to authenticate itself to host device 210. ID module 284 may have dedicated hardware circuitry to perform the accessory authentication process, and may also have its own microcontroller, memory, and software according to some embodiments. ID module 284 may include an accessory identifier stored therein that identifies the type, function, manufacturer, and/or model of accessory 280. In some embodiments, the accessory identifier may also indicate whether accessory 280 includes an accessory boot loader stored in NVM 282 of accessory 280. ID module 284 may include hardware and/or software adapted to respond to a request from host device 210 for an accessory identifier to identify accessory 280. For example, ID module 284 may include circuitry to detect a certain voltage, current, impedance, capacitance, frequency, or other electrical characteristic, or a change in such an electrical characteristic on host interface 286 that may represent a request for an accessory identifier. Additionally or alternatively, ID module 284 may include hardware and/or software that can interpret an ID request command in a format according to a communication protocol/standard. Upon receiving a request for an accessory identifier on host interface 286, ID module 284 may send the accessory identifier stored in ID module 284 to host device 210 through host interface 286. ID module 284 may also be used by accessory 280 to identify or authenticate a peripheral device that is coupled to peripheral interface 288.

In other embodiments, some or all of the functionality of ID module 284 may be implemented using controller 281 and program code stored in NVM 282. For example, in some embodiments, accessory 280 may store, in NVM 282, an accessory identifier identifying accessory 280, and program code executable by controller 281 to send the accessory identifier identifying accessory 280 to a host device in response to receiving a request for an accessory identifier from the host device.

It will be appreciated that the system configurations and components described herein are illustrative and that variations and modifications are possible. The host device 210 and/or accessory 280 may have other capabilities not specifically described herein. While accessory 280 and host device 210 are described herein with reference to particular blocks, it is to be understood that the blocks are defined for convenience of description and are not intended to imply a particular physical arrangement of component parts. Further, the blocks need not correspond to physically distinct components.

Figure 3:
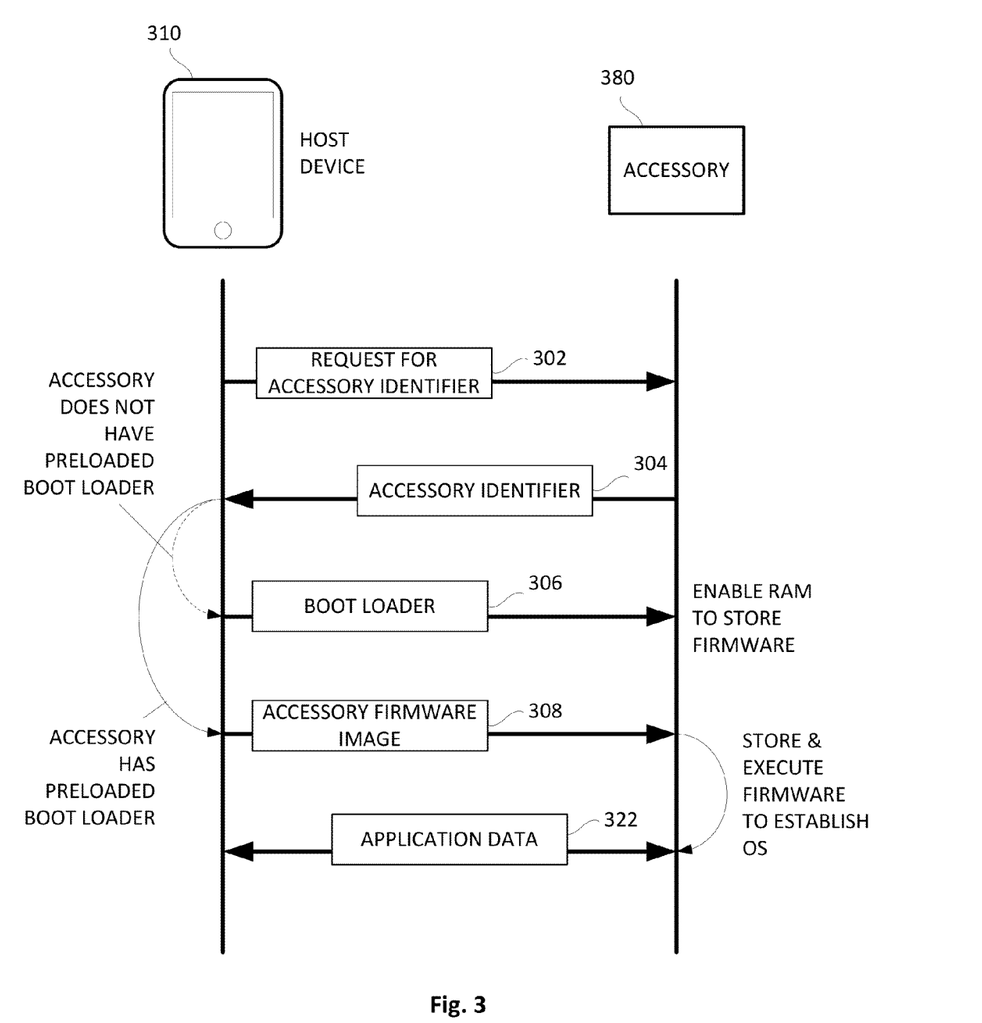
FIG. 3 illustrates a diagram showing the exchange of information between an accessory and a host device during a boot sequence of the accessory according to one embodiment of the present invention.

FIG. 3 shows a diagram illustrating the exchange of information between a host device 310 and an accessory 380 during a boot sequence of accessory 380 according to one embodiment. Accessory 380 may initiate its boot sequence when accessory 380 is turned on (e.g., when accessory 380 initially receives power from host device 310 or other power source, or when a command to turn on accessory 380 is received from a user interface, etc.), and/or when accessory 380 comes out of a reset or sleep state.

In some embodiments, accessory 380 begins its boot sequence by executing host interface initialization code that may be stored in the non-volatile memory (NVM) of accessory 380. The execution of the host interface initialization code may enable the host interface of accessory 380 thereby enabling accessory 380 to communicate with host device 310. The host interface initialization code may include program code that accessory 380 may use to enable the host interface of accessory 380 to establish a communication channel between accessory 380 and host device 310 via the host interface of accessory 380. The communication channel can be achieved with a wired connection through physical attachment (e.g., between respective mating connectors of host device 310 and accessory 380), with an indirect attachment such as a cable, or by establishing a wireless connection. A variety of communication channels may be used, including wired channels such as USB, FireWire, or UART, or wireless channels such as wireless USB, Bluetooth, WiFi, wireless personal area network, infrared, or the like. Thus, the host interface initialization code may include program code for establishing a connection between host device 310 and accessory 380 that adhere to the particular communication protocol/standard being used in the connection between host device 310 and accessory 380. In some embodiments, communication can occur using both a wired and a wireless channel. In some embodiments, multiple communication channels between a host device and an accessory can be used, or a host device can be concurrently connected to multiple accessories, with each accessory using a different communication channel.

In some embodiments, the host interface initialization code can also include program code used by accessory 380 to authenticate itself to host device 310. In other embodiments, the authentication process can be performed using a separate ID module in accessory 380. When host device 310 detects a connection being established between host device 310 and accessory 380, host device 310 may send a request 302 for an accessory identifier to accessory 380. The request for an accessory identifier 302 may be a certain voltage, current, impedance, capacitance, frequency, or other electrical characteristic, or a change in such an electrical characteristic that host device 310 provides to the host interface of accessory

380. Additionally or alternatively, the request for an accessory identifier 302 may include an ID request command in a format according to the communication protocol/standard being used in the connection between host device 310 and accessory 380.

In response to receiving request 302 for an accessory identifier, accessory 380 may send an accessory identifier 304 to host device 310. In some embodiments, accessory identifier 304 may indicate the type, function, manufacturer, and/or model of accessory 380. Accessory identifier 304 may also include information to indicate whether accessory 380 has a preloaded accessory boot loader, or a boot status to indicate which stage of the boot sequence accessory 380 is currently in. Host device 310 may use this information to determine if host device 310 needs to send an accessory boot loader to accessory 380. In some embodiments, accessory identifier 304 may be a device ID that adheres to the communication protocol/standard being used in the connection between host device 310 and accessory 380. For example, in an embodiment that uses a USB link (e.g., wired or wireless) as the connection between accessory 380 and host device 310, accessory identifier 304 may be a USB descriptor of accessory 380. Accessory identifier 304 may also include other information such as speed, bandwidth, and/or voltage levels that the host interface of accessory 380 can support.

It should be understood that in some embodiments, the authentication process to authenticate accessory 380 to host device 310 may be implemented as part of the communication protocol/standard being used in the connection between host device 310 and accessory 380. For example, in an exemplary embodiment, a USB link (e.g., wired or wireless) may be used to connect host device 310 to accessory 380. In order to establish the USB link, compliance with the USB standard may require host device 310 to send out a USB device request, and accessory 380 to respond to the USB device request with a USB descriptor. In such an embodiment, the USB device request from host device 310 in accordance with the USB standard can serve as request 302, and/or the USB descriptor from accessory 380 in accordance with the USB standard can serve as accessory identifier 304. Hence, in some embodiments, host device 310 may not need to send request 302 and/or accessory 380 may not need to send accessory identifier 304 separately outside of the normal protocol of the communication protocol/standard being used, if such an authentication process is already part of the normal protocol of the communication protocol/standard being used.

When host device 310 receives accessory identifier 304 from accessory 380, host device 310 may authenticate accessory 380 if accessory identifier 304 is recognized by host device 310 to be valid. If accessory 308 is a valid accessory that can be used with host device 310, host device 310 may select a suitable accessory firmware image 308 from one or more accessory firmware images stored in host device 310. Host device 310 may select accessory firmware image 308 based on the information provided in accessory identifier 304 (e.g., type, function, manufacture, and/or model of accessory 308).

In some embodiments, host device 310 may also determine, using the accessory identifier 304, if accessory 380 requires host device 310 to transmit an accessory boot loader to accessory 380 to enable accessory 380 to load accessory firmware image 308. If accessory identifier 304 indicates that accessory 380 does not have a preloaded accessory boot loader in accessory 380, host device 310 may select an appropriate accessory boot loader 306 for accessory 380, and transmit accessory boot loader 306 to accessory 380. If accessory identifier 304 indicates that accessory 308 has a preloaded accessory boot loader (e.g., in the NVM of accessory 380), host accessory 380 may omit sending accessory boot loader 306 to accessory 380. In other embodiments, host device 310 may optionally send a request to accessory 380 to ask accessory 380 if it needs an accessory boot loader. Accessory 380 may send a respond to host device 310 indicating whether accessory 380 needs an accessory boot loader. Host device 310 may send an appropriate accessory boot loader 306 to accessory 380 accordingly.

Next, accessory 380 may execute accessory boot loader 306 (or a preloaded accessory boot loader in the NVM of accessory 380) to load an accessory firmware image 308 from host device 310 into the main memory (e.g., RAM) of accessory 380. In some embodiments, accessory boot loader 306 (or a preloaded accessory boot loader) may include program code to instruct accessory 380 to load accessory firmware image 308 at a particular memory location in the main memory (e.g., RAM) of accessory 380. Accessory boot loader 306 (or a preloaded accessory boot loader) may also provide instructions to accessory 380 to execute or load only certain portions of accessory firmware image 308 that are relevant to accessory 380. In some embodiments, as part of executing accessory boot loader 306 (or a preloaded accessory boot loader), accessory 380 may send a signal (e.g., a command, a subsequent accessory identifier with an updated boot status, etc.) to host device 310 to indicate to host device 310 that accessory 380 is ready to receive accessory firmware image 308 from host device 310. Upon receiving this signal, host device 310 may transmit accessory firmware image 308 to accessory 380. Alternatively, in other embodiments, host device 310 may automatically transmit accessory firmware image 308 to accessory 380 without requiring a signal from accessory 380. Accessory 380 can then store accessory firmware image 308 received from host device 310 into the main memory (e.g., RAM) of accessory 308.

Once accessory firmware image 308 is stored in the main memory (e.g., RAM) of accessory 380, accessory 380 can complete its boot sequence by executing accessory firmware image 308 from the main memory (e.g., RAM) of accessory 380. Accessory firmware image 308 may include program code to instruct accessory 380 to load an OS and/or application program(s) that accessory 380 can run to manage and perform the functionality of accessory 380. In some embodiments, because accessory 380 relies on host device 310 for an accessory firmware image that accessory 380 uses for booting, compatibility between the accessory software loaded by accessory firmware image 308 and the software running on host device 310 can be ensured. For example, in some embodiments, host device 310 may update the accessory firmware images stored in host device 310 whenever the host firmware image of host device 310 is updated. This way, the accessory firmware images stored in host device 310 can be maintained in a version that is consistent and compatible with the host firmware image that the host device 310 boots with.

After accessory 380 establishes a compatible OS and/or completes loading application program(s) that can be used by accessory 380 to interoperate with host device 310, accessory 380 may begin exchanging application data 322 (e.g., video data, audio data, or the like) with host device 310. In some embodiments, after the accessory software is successfully loaded in accessory 380, the connection between accessory 380 and host device 310 may be reconfigured or re-provisioned into a mode or configuration (e.g., speed, bandwidth, voltage, protocol, etc.) that is suitable for exchanging application data 322. For example, in one exemplary embodiment, the connection between host device 310 and accessory 380 may be a USB link, and application data 322 may be a video stream. The USB link may have been set in a low speed mode for the transmission of accessory firmware image 308. However, to properly stream a video over the USB link, a high speed mode may be required. Thus, the USB link can be reconfigured or re-provisioned into a high speed mode after the accessory 380 completes its boot sequence. In some embodiments, reconfiguration or re-provisioning of the connection may include sending a new accessory identifier from accessory 380 to host device 310. The new accessory identifier can be used to indicate to the host device 310 that accessory 380 has completed its boot sequence, and that the connection between accessory 380 and host device 310 can be reconfigured or re-provisioned for transmission of application data 322. For example, the new accessory identifier may include information to indicate the speed, bandwidth, voltage levels, and/or protocol that the connection may use to exchange application data 322.

Figure 4:
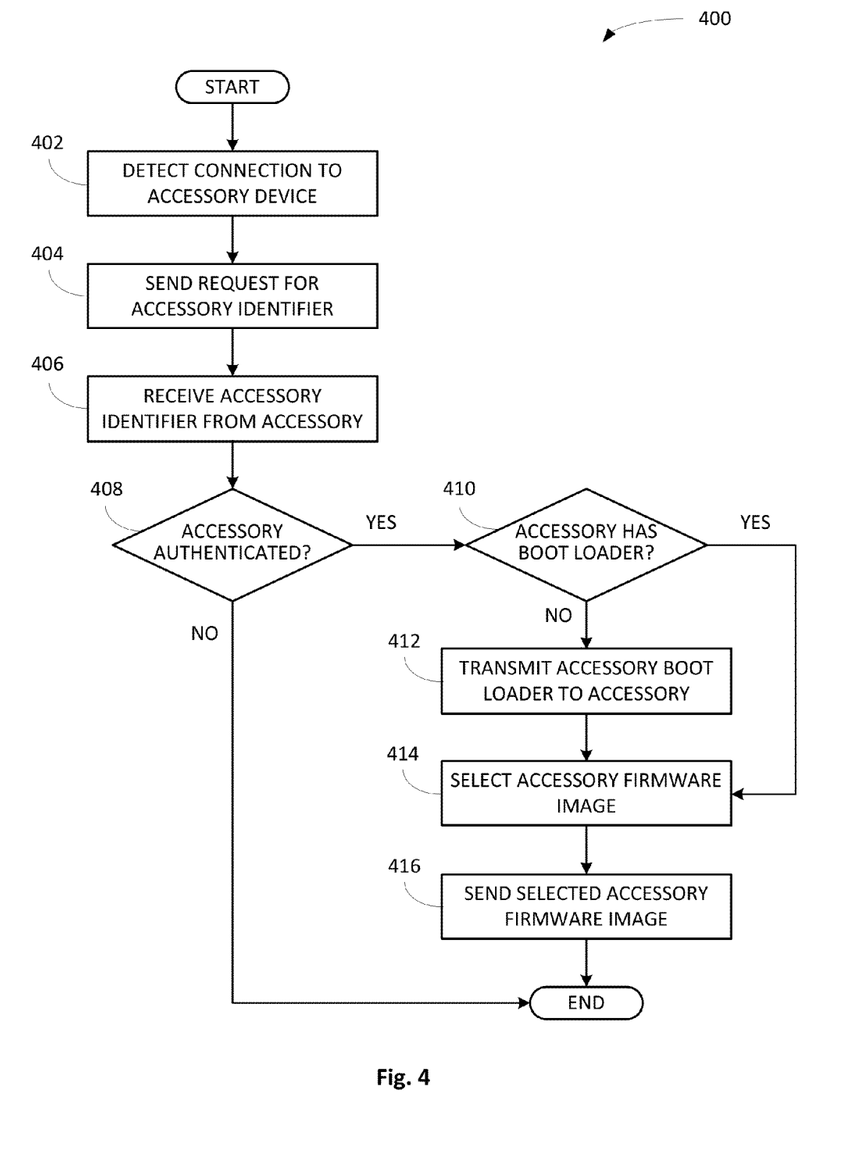
FIG. 4 illustrates a flow diagram of a process for booting an accessory using a host device according to one embodiment of the present invention.

FIG. 4 illustrates a flow diagram of a process 400 for booting an accessory (e.g., accessory 130, 140, 280, or 380) using a host device (e.g., host device 110, 210, or 310) according to one embodiment of the present invention. At block 402, a host device may detect that a connection is established between the host device and an accessory. A variety of connection schemes may be used as described above.

At block 404, in response to detecting a connection between the host device and the accessory, the host device may send a request for an accessory identifier, e.g., as described above, to the accessory. At block 406, the host device may receive from the accessory an accessory identifier for identifying the accessory. The accessory identifier may include one or more items of information as described above. At block 408, the host device may determine, based on the information provided in the accessory identifier, if the accessory can be authenticated, i.e. if the accessory is a valid accessory that can be used with the host device. If the host device does not recognize the accessory identifier (i.e. the accessory is an unknown device), or determines that the features or functionality of the accessory cannot be used with the host device, or that the host device does not have an accessory firmware image suitable for this particular accessory, the process may be terminated because the particular accessory cannot be used with the host device. If the host device recognizes the accessory as a valid accessory based on the information provided in the accessory identifier, the process can continue to block 410.

At block 410, the host device determines if the accessory has a preloaded accessory boot loader in the accessory. In some embodiments, the host device may use information in the accessory identifier to determine if the accessory has a preloaded accessory boot loader, as described above. If the host device determines that the accessory has a preloaded accessory boot loader program, the process can continue to block 414. If the host device determines that the accessory does not have a preloaded accessory boot loader, the host device may select an accessory boot loader that is suitable for the accessory (e.g., based on the information provided in the accessory identifier) from among one or more accessory boot loaders that may be stored in the host device. The host device may transmit the selected accessory boot loader to the accessory at block 412 prior to transmitting an accessory firmware image to the accessory. The accessory boot loader may include information such as executable program code that the accessory can use to properly load an accessory firmware image from the host device. For example, in some embodiments, the accessory boot loader may include information to instruct the accessory to load an accessory firmware image from the host device at a particular memory location, and/or to instruct the accessory to execute or load only certain portions of an accessory firmware image that are relevant to the accessory.

At block 414, the host device selects a suitable accessory firmware image for the accessory from among one or more accessory firmware images that may be stored in the host device. The host device may select the accessory firmware image based on the information provided in the accessory identifier (e.g., type, function, manufacturer, and/or model of the accessory). The selected accessory firmware image may include information such as executable program code that the accessory can use to enable the accessory to exchange application data (e.g., video data, audio data, and/or the like) and interoperate with the host device. For example, the selected accessory firmware image may include program code that the accessory can execute to load accessory software such as an OS and/or application program(s) that are compatible with the software running on the host device. At block 416, the host device may transmit the selected accessory firmware image to the accessory via the connection between the host device and the accessory. The accessory may then complete its boot sequence by storing and executing the selected accessory firmware image received from the host device.

It will be appreciated that process 400 described herein is illustrative and that variations and modifications are possible. Acts described as sequential can be executed in parallel, order of acts can be varied, and acts can be modified or combined.

Figure 5:
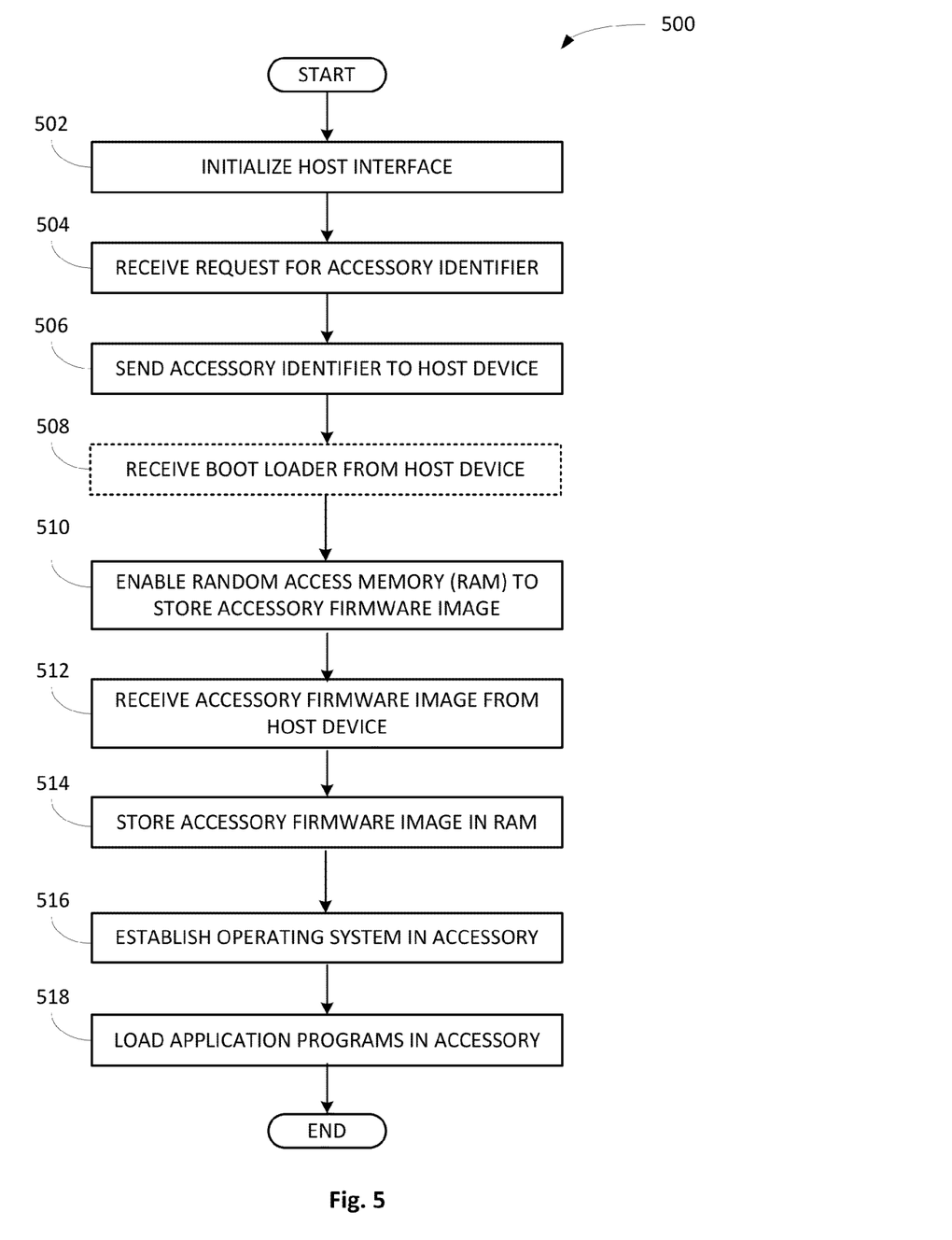
FIG. 5 illustrates a flow diagram of a process for booting an accessory according to another embodiment of the present invention.

FIG. 5 illustrates a flow diagram of a process 500 for booting an accessory (e.g., accessory 130, 140, 280, or 380) according to one embodiment. Process 500 can be performed, e.g., by accessory 380 of FIG. 3. In some embodiments, the boot sequence of the accessory may be implemented in multiple stages in which each stage may execute one or more pieces of program code in a certain order to enable the accessory to exchange application data and interoperate with a host device, for example, by loading software such as an OS and/or application program(s) into the main memory of the accessory. For example, in some embodiments, the accessory may use a 3-stage boot sequence that executes, in order, the following program code: (1) host interface initialization code; (2) accessory boot loader; and (3) accessory firmware image.

In the first stage of the boot sequence according to some embodiments, when the accessory receives power or is turned on, or when the accessory exits a reset or sleep state, the accessory may begin executing the host interface initialization code stored in the non-volatile memory of the accessory. At block 502, execution of the host interface initialization code may cause the accessory to initialize the accessory's host interface to enable the host interface to communicate with a host device. Initializing the host interface may include providing power to the host interface and authenticating the accessory to a host device through the host interface to establish a communication channel with a host device.

In some embodiments, authenticating the accessory may include receiving, from a host device, a request for providing an accessory identifier to identify the accessory (block 504). The request for providing the accessory identifier may be a certain voltage, current, impedance, capacitance, frequency, or other electrical characteristic, or a change in such an electrical characteristic, or a device ID request according to a communication protocol/standard (e.g., a USB device request) detected on the host interface of the accessory.

In response to the request at block 504, the accessory may send the accessory identifier to the host device at block 506. The accessory identifier may indicate the type, function, manufacturer, and/or model of the accessory. The accessory identifier may also include information to indicate whether the accessory has a preloaded accessory boot loader in the accessory. The host device may use this information to determine if the host device is to send an accessory boot loader to the accessory. In some embodiments, the accessory identifier may be a device ID according to a communication protocol/ standard (e.g., a USB descriptor). The accessory identifier may also include other information to indicate the speed, bandwidth, and/or voltage levels that the host interface of the accessory can support.

In some embodiments, if the accessory does not have a preloaded accessory boot loader stored therein, the accessory may receive an accessory boot loader from the host device at block 508. The host interface initialization code may include program code that the accessory can execute to store an accessory boot loader received from the host device into the main memory of the accessory. For example, the host interface initialization code may include program code containing instructions to direct the accessory to load the accessory boot loader received from the host device at a particular location in the main memory of the accessory.

In the second stage of the boot sequence according to some embodiments, the accessory begins executing accessory boot loader. At block 510, the accessory executes program code in the accessory boot loader to initialize and enable the main memory (e.g., RAM) of the accessory to store an accessory firmware image. In some embodiments, this may include instructing the accessory to load an accessory firmware image at a particular memory location in the main memory (e.g., RAM) of the accessory and/or to execute or load only certain portions of an accessory firmware image that are relevant to the accessory. At block 512, the accessory receives an accessory firmware image from the host device. At block 514, the accessory stores the accessory firmware received from the host device into the main memory (e.g., RAM) of the accessory according to the instructions provided in the accessory boot loader.

In the third stage of the boot sequence according to some embodiments, the accessory executes the accessory firmware image from the main memory (e.g., RAM) of the accessory. The accessory firmware image may include program code that the accessory can execute to establish an OS or to load application program(s) or other accessory software that the accessory can run to exchange application data (e.g., video data, audio data, and/or the like) with the host device. At block 516, the accessory establishes an operating system (OS) that is compatible with and can interoperate with the host device. The OS can be used by the accessory to manage its components (e.g., main memory, accessory specific hardware, user interface, etc.) and functions. At bock 518, the accessory loads application program(s) that the accessory can use to interoperate with the host device (e.g., to exchange application data) and/or to perform the functions of the accessory. In some embodiments, the connection between the host device and the accessory can be re-provisioned or reconfigured after the accessory completes its boot sequence. The connection may be re-provisioned or reconfigured into a mode or configuration (e.g., speed, bandwidth, protocol, etc.) that is suitable to exchange application data according to the functionality of the accessory.

It will be appreciated that process 500 described herein is illustrative and that variations and modifications are possible. Acts described as sequential can be executed in parallel, order of acts can be varied, and acts can be modified or combined.

Figure 6:
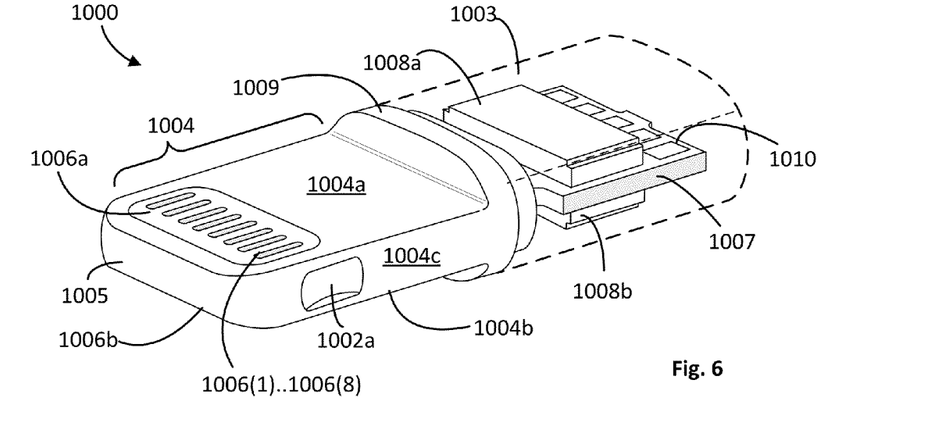
FIG. 6 illustrates a perspective view of a plug connector according to an embodiment of the present invention.

FIG. 6 illustrates a simplified perspective view of one embodiment of a plug connector 1000 that can be used to implement some of the connectors described above. As shown in FIG. 6, plug connector 1000 includes a body 1003 and a tab portion 1004 that extends longitudinally away from body 1003 in a direction parallel to the length of the connector. Tab portion 1004 is sized to be inserted into a corresponding receptacle connector during a mating event. Tab portion 1004 includes a first contact region 1006a formed on a first major surface 1004a and a second contact region 1006b formed at a second major surface 1004b opposite of surface 1004a. Surfaces 1004a and 1004b extend from a distal tip of tab portion 1004 to a spine 1009. When tab portion 1004 is inserted into a corresponding host receptacle connector, spine 1009 abuts the housing of the host receptacle connector or the host device. Tab portion 1004 also includes first and second opposing side surfaces 1004c and 1004d that extend between the first and second major surfaces 1004a and 1004b. In one particular embodiment, tab portion 1004 is 6.6 mm wide, 1.5 mm thick and has an insertion depth (the distance from the tip of tab portion 1004 to spine 1009) of 7.9 mm.

The structure and shape of tab portion 1004 is defined by a ground ring 1005 that can be made from stainless steel or another hard conductive material. Plug connector 1000 includes retention features 1002a and 1002b formed as curved pockets in the sides of ground ring 1005 that can also be used as ground contacts. Body 1003 is shown in FIG. 6 in transparent form (via dotted lines) so that certain components inside body 1003 are visible. As shown, within body 1003 is a printed circuit board (PCB) 1007 that extends into ground ring 1005 between contact regions 1006a and 1006b towards the distal tip of plug connector 1000. One or more integrated circuits (ICs), such as Application Specific Integrated Circuit (ASIC) chips 1008a and 1008b, can be coupled to PCB 1007 to provide information about the device associated with connector 1000 and/or to perform specific functions, such as authentication, identification, contact configuration, current or power regulation, and/or signal and/or power conversion.

Bonding pads 1010 can also be formed within body 1003 near the end of PCB 1007. Each bonding pad can be connected to a contact or contact pair within contact regions 1006a and 1006b. Wires (not shown) can then be soldered to the bonding pads to provide an electrical connection from the contacts to circuitry within the device associated with connector 1000. In some embodiments, however, bonding pads are not necessary and instead all electrical connections between the contacts and components of plug connector 1000 and other circuitry within the device associated with connector 1000 are made through traces on a PCB that the circuitry is coupled to and/or by interconnects between multiple PCBs within the device associated with connector 1000.

As shown in FIG. 6, up to eight external contacts 1006(1) ... 1006(8) can be spaced apart along a single row in contact region 1006a. A similar set of eight contacts (not shown) can be spaced apart along a single row in contact region 1006b. The two rows of contacts are directly opposite each other and each contact in contact region 1006a is electrically connected to a corresponding contact in contact region 1006b on the opposite side of the connector. Contacts 1006(1) ... 1006(8) can be used to carry a wide variety of signals including digital signals and analog signals as well as power and ground. When plug connector 1000 is properly engaged with a receptacle connector, each of contacts 1006(1)-1006(8) is in electrical connection with a corresponding contact of the receptacle connector.

Figure 7A:
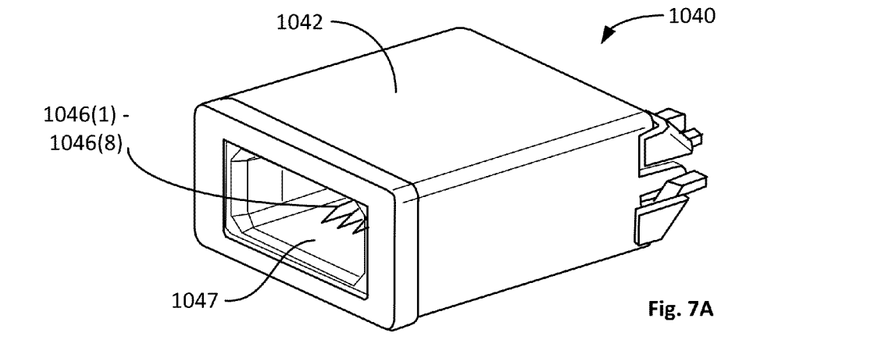
FIG. 7A illustrates a perspective view of a receptacle connector that is compatible with a plug connector according to an embodiment of the present invention.

FIG. 7A illustrates a simplified perspective view of one embodiment of a receptacle connector 1040 that plug connector 1000 can be coupled with. Receptacle connector 1040 includes a housing 1042 that defines a cavity 1047 and houses up to eight contacts 1046(1)-1046(8) within cavity 1047. Housing 1042 can be integrated into a housing of a host device. In operation, a connector plug, such as plug connector 1000 can be inserted into cavity 1047 to electrically couple the contacts 1006(1)-1006(8) to respective contacts 1046(1)-1046(8). Each of the receptacle contacts 1046(1)-1046(8) electrically connects its respective plug contact to circuitry associated with the electrical device (e.g., a host device) in which receptacle connector 1040 is housed. Note that receptacle connector 1040 includes contacts on a single side so it can be made thinner. In other embodiments, receptacle connector 1040 may have contacts on each side while plug connector 1000 may only have contacts on a single side.

Figure 7B:
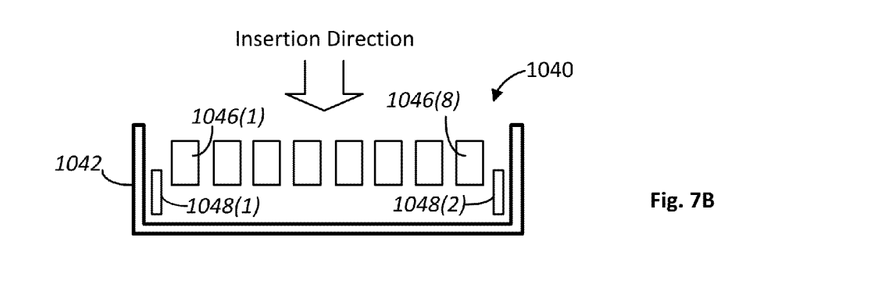
FIG. 7B illustrates a planar cross-section view of a receptacle connector that is compatible with a plug connector according to an embodiment of the present invention.

FIG. 7B illustrates a planar cross-section view of receptacle connector 1040. As shown in FIG. 7B, contacts 1046(1)-1046(8) in receptacle connector 1040 are spaced apart in a single row. The contacts are positioned within a cavity 1047 that is defined by a housing 1042. Receptacle connector 1040 also includes side retention mechanisms 1046a and 1046b (not shown) that engage with retention features 1002a and 1002b in plug connector 1000 to secure plug connector 1000 within cavity 1047 once the connectors are mated. Receptacle connector 1040 also includes two contacts 1048(1) and 1048(2) that are positioned slightly behind the row of signal contacts and can be used to detect when plug connector 1000 is inserted within cavity 1047 and detect when plug connector 1000 exits cavity 1047 when the connectors are disengaged from each other.

When tab portion 1004 of plug connector 1000 is fully inserted within cavity 1047 of receptacle connector 1040 during a mating event, each of contacts 1006(1) ... 1006(8) from contact region 1006a or contacts from 1006b are physically and electrically coupled to one of contacts 1046(1) ... 1046(8) depending on the insertion orientation of plug connector 1000 with respect to receptacle connector 1040. Thus, contact 1046(1) will be physically connected to either contact 1006(1) or 1006(8) depending on the insertion orientation; data contacts 1046(2) and 1046(3) will connect with either data contacts 1006(2) and 1006(3) or with data contacts 1006(7) and 1006(6) depending on the insertion orientation, etc.

Figure 8A:
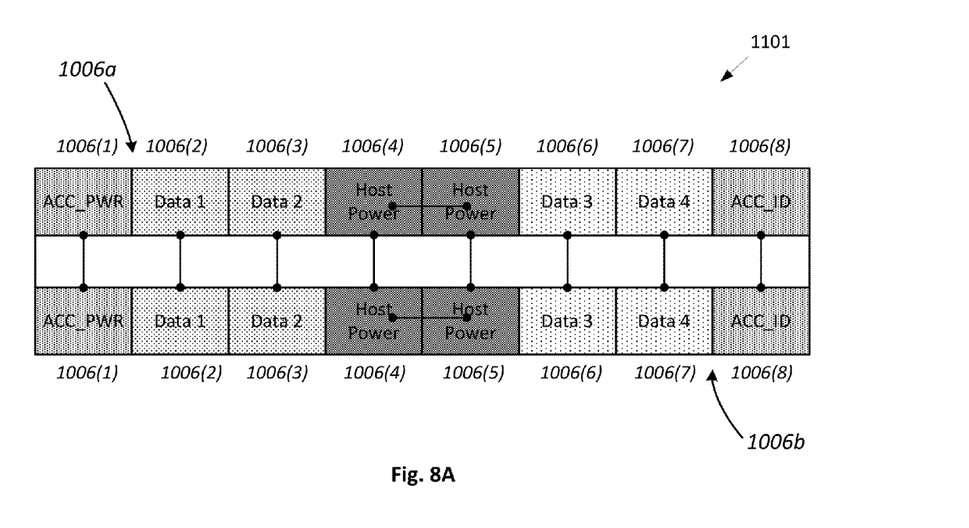
FIG. 8A illustrates an exemplary pin-out of a connector according to an embodiment of the present invention.

FIG. 8A illustrates one particular implementation of a pin-out 1101 for plug connector 1000 (or a pin-out for a compatible receptacle connector 1040), according to one embodiment of the invention. On one side of plug connector 1000 for contact region 1006a, pin-out 1101 shown in FIG. 8A includes two host power contacts 1006(4) and 1006(5) that are electrically coupled together to function as a single contact dedicated to carrying power; an accessory ID contact 1006(8); an accessory power contact 1006(1); and four data contacts 1006(2), 1006(3), 1006(6) and 1006(7). Host power contacts 1006(4) and 1006(5) can be sized to handle any reasonable power requirement for a host device, and for example, can be designed to carry between 3-20 Volts from an accessory to charge a host device connected to plug connector 1000. Host power contacts 1006(4) and 1006(5) are positioned in the center of contact regions 1006a and 1006b to improve signal integrity by keeping power as far away as possible from the sides of ground ring 1005.

Accessory power contact 1006(1) can be used for an accessory power signal that provides power from the host to an accessory. The accessory power signal is typically a lower voltage signal than the power in signal received over host power contacts 1006(4) and 1006(5), for example, 3.3 Volts as compared to 5 Volts or higher. The accessory ID contact 1006(8) provides a communication channel that enables a host device to authenticate an accessory and enables an accessory to communicate information to the host device about the accessory's capabilities.

Figure 8B:
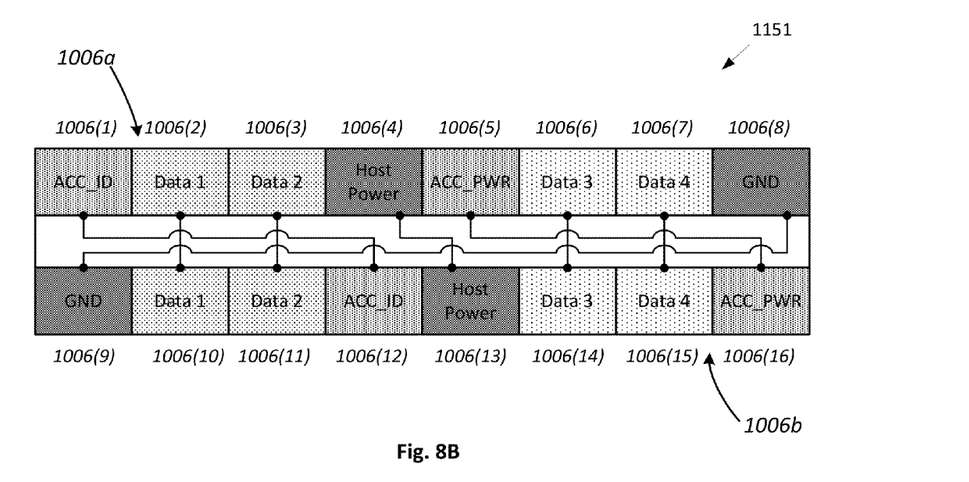
FIG. 8B illustrates an exemplary pin-out of a connector according to another embodiment of the present invention.

Data contacts 1006(2), 1006(3), 1006(6) and 1006(7) can be used for data communication between the host device and accessory using one or more communication protocols. Data contacts 1006(2) and 1006(3) are positioned adjacent to and on one side of the host power contacts 1006(4) and 1006(5), while data contacts 1006(6) and 1006(7) are positioned adjacent to but on the other side of the host power contacts 1006(4) and 1006(5). The accessory power contact 1006(1) and accessory ID contact 1006(8) are positioned at each end of the connector. The data contacts can be high speed data contacts that operate at rate that is two or three orders of magnitude faster than any signals sent over the accessory ID contact 1006(8) which causes the accessory ID signal to appear essentially as a DC signal to the high speed data lines. Thus, positioning the data contacts 1006(2) and 1006(3) between accessory power contact 1006(1) and host power contact 1006(4), and positioning the data contacts 1006(6) and 1006(7) between host power contact 1006(5) and accessory ID contact 1006(8), improve signal integrity by sandwiching the data signals between contacts designated for DC signals or essentially DC signals FIG. 8B illustrates another particular implementation of a pin-out 1151 for plug connector 1000 (or a pin-out for a compatible receptacle connector 1040) according to another embodiment of the invention. Similar to pin-out 1101, the plug connector having pin-out 1151 is a reversible connector. In other words, based on the orientation in which the plug connector is mated with a corresponding host connector of a host device, either the contacts on the contact region 1006a or 1006b are in physical and electrical contact with the contacts in the corresponding host connector of the host device. As illustrated in FIG. 8B, there are eight contacts arranged within contact region 1006a and eight contacts arranged within contact region 1006b.

Pin-out 1151 shown in FIG. 8B includes two contacts 1006(1) and 1006(12) that can function as accessory ID contacts to carry the adapter identification signals between adapter 40 and the host device. Contacts 1006(1) and 1006(12) are electrically connected to each other. The pin-out shown in FIG. 8B can have four pairs of data contacts: (a) 1006(2) and 1006(3); (b) 1006(6) and 1006(7); (c) 1006(10) and 1006(12); and (d) 1006(14) and 1006(15). In this particular embodiment, opposing data contacts, e.g., 1006(2) and 1006(10), are electrically connected to each other. Pin-out 1151 further includes host power contacts 1006(4) or 1006(13) that may be electrically connected to each other. Host power contacts 1006(4) or 1006(13) carry power to the host device that is mated with plug connector 1000. For example, plug connector 1000 may be part of a power supply system designed to provide power to the host device. In this instance, either host power contact 1006(4) or 1006(13) may carry power from the power supply to the host device, e.g., to charge a battery in the host device.

Pin-out 1151 of FIG. 8B may further include accessory power contacts 1006(5) and 1006(16) that may be electrically connected to each other. Accessory power contacts carry power from the host device to a connected accessory. For example, in some instances, an accessory connected to the host device may not be self-powered and may derive its power from the host device. In this instance, the host device can supply power to the accessory over either of the accessory contacts, depending on the orientation of plug connector 1000. Pin-out 1151 of FIG. 8B may further include two ground contacts 1006(8) and 1006(9) electrically connected to each other. The ground contacts provide a ground path for plug connector 1000.

Circuits, logic modules, processors, and/or other components can be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable storage media; suitable media include magnetic disk or tape, optical storage media, such as compact disk (CD) or DVD (digital versatile disk), flash memory, and the like. Computer readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. A method for booting an accessory using a host device that includes a host firmware image and a plurality of accessory firmware images stored therein, the method comprising:
   detecting, by the host device, a connection between the host device and the accessory;
   sending, by the host device to the accessory, a request for an accessory identifier;
   receiving, by the host device from the accessory, the accessory identifier;
   selecting, by the host device, an accessory firmware image, from among the plurality of accessory firmware images, based at least in part on the accessory identifier, wherein the selected accessory firmware image includes information usable by the accessory to establish an operating system running on the accessory and
   transmitting, by the host device to the accessory, the selected accessory firmware image.

2. The method of claim 1, further comprising:
   transmitting, by the host device to the accessory, an accessory boot loader prior to transmitting the selected accessory firmware image, wherein the accessory boot loader is executed by the accessory to load the selected accessory firmware image into a random access memory of the accessory.

3. The method of claim 1, wherein each of the plurality of accessory firmware images stored in the host device is based in part on the host firmware image.

4. The method of claim 3, wherein each of the plurality of accessory firmware images stored in the host device is maintained to be in a version that is compatible with the host firmware image.

5. The method of claim 1, wherein the selected accessory firmware image is transmitted via a Universal Serial Bus (USB) link between the host device and the accessory.

6. The method of claim 5, wherein the accessory identifier is a USB descriptor.

7. A method for booting an accessory, the method comprising:
   receiving, by the accessory from a host device coupled to the accessory, a request for an accessory identifier;
   sending, by the accessory to the host device, the accessory identifier;
   receiving, by the accessory from the host device, an accessory firmware image associated with the accessory identifier; and
   executing, by the accessory, the accessory firmware image to boot the accessory;
   wherein the accessory does not store any accessory firmware image prior to receiving the accessory firmware image from the host device.

8. The method of claim 7, further comprising:
   establishing, by the accessory, an operating system in the accessory using information in the accessory firmware image.

9. The method of claim 7, further comprising:
   receiving, by the accessory from the host device, an accessory boot loader prior to receiving the accessory firmware image, and
   loading, by the accessory, the accessory firmware image into a random access memory of the accessory using the accessory boot loader.

10. The method of claim 7, wherein the accessory comprises one or more non-volatile memory devices and the accessory firmware image is of a size that is larger than memory capacity of each of the one or more non-volatile memory devices.

11. The method of claim 7, wherein the accessory firmware image is received via a Universal Serial Bus (USB) link between the host device and the accessory.

12. The method of claim 11, wherein the wherein the accessory identifier is a USB descriptor associated with the accessory.

13. A host device comprising:
    a processor; and
    a storage component coupled to the processor, the storage component storing a plurality of firmware images including a host firmware image associated with the host device and a plurality of accessory firmware images each associated with at least one accessory;
    wherein the processor in conjunction with the storage component is configured to:
      detect connection of an accessory with the host device;
      receive an accessory identifier from the accessory;
      select an accessory firmware image, from among the plurality of accessory firmware images, based at least in part on the accessory identifier, wherein the selected accessory firmware image is usable by the accessory to establish an operating system in the accessory; and
      communicate the selected accessory firmware image to the accessory.

14. The host device of claim 13, wherein the selected accessory firmware is usable by the accessory during a boot sequence of the accessory.

15. The host device of claim 13, wherein the processor in conjunction with the storage component is further configured to:

communicate an accessory boot loader to the accessory prior to communicating the selected accessory firmware image to the accessory, wherein the boot loader is usable by the accessory to load the selected accessory firmware image into a memory of the accessory.

16. The host device of claim 13, wherein each of the plurality of accessory firmware images stored in the host device is maintained to be in a version that is compatible with the host firmware image.

17. The host device of claim 13, wherein the selected accessory firmware image is communicated via a Universal Serial Bus (USB) link between the host device and the accessory.

18. The host device of claim 17, wherein the accessory identifier is a USB descriptor.

19. An accessory comprising:
a controller;
a random access memory (RAM) coupled to the controller; and
a non-volatile memory coupled to the controller,
wherein the controller is configured to:
receive, from a host device, an accessory firmware image;
store the accessory firmware image in the RAM; and
execute the accessory firmware image from the RAM to enable the accessory to establish an operating system running on the accessory;
wherein the accessory does not store any accessory firmware image in the RAM or in the non-volatile memory prior to receiving the accessory firmware image from the host device.

20. The accessory of claim 19, wherein the controller is further configured to:
receive an accessory boot loader from the host device prior to receiving the accessory firmware image, wherein the accessory boot loader is used by the accessory to load the accessory firmware image into the RAM of the accessory.

21. The accessory of claim 19, wherein the accessory firmware image is of a size that is larger than memory capacity of the non-volatile memory.

22. The accessory of claim 19, wherein the accessory firmware image is received via a Universal Serial Bus (USB) link between the host device and the accessory.

23. The accessory of claim 22, wherein the accessory identifier is a USB descriptor.

24. The method of claim 1 further comprising sending a device driver to the accessory after an operating system is established and running in the accessory.

25. The method of claim 8 further comprising, after establishing an operating system in the accessory, communicating, by the accessory, with the host to obtain a device driver from the host.

26. The method of claim 8 further comprising, prior to establishing an operating system in the accessory, executing host initialization code, by the accessory, to establish a communication channel between the accessory and the host.

27. The method of claim 26 further comprising authenticating the accessory to the host prior to establishing an operating system in the accessory.

28. The method of claim 27 wherein the accessory identifier includes information that indicates whether the accessory has a preloaded accessory boot loader.

29. The host of claim 13 wherein the processor is configured to send a device driver to the accessory after an operating system is established and running in the accessory.

30. The accessory of claim 19 wherein the controller is further configured to, after an operating system is established and running in the accessory, communicate with the host to obtain a device driver from the host.

* * * * *